US009386344B2

(12) United States Patent
Schaefer et al.

(10) Patent No.: US 9,386,344 B2
(45) Date of Patent: Jul. 5, 2016

(54) METHOD OF TRANSMITTING DIGITAL SERVICES OVER A NETWORK AND DEVICE IMPLEMENTING THE METHOD

(75) Inventors: Ralf Schaefer, Acigne (FR); Yves Maetz, Melesse (FR)

(73) Assignee: THOMSON LICENSING, Boulogne-Billancourt (FR)

( * ) Notice: Subject to any disclaimer, the term of this patent is extended or adjusted under 35 U.S.C. 154(b) by 1733 days.

(21) Appl. No.: 10/584,324

(22) PCT Filed: Jan. 4, 2005

(86) PCT No.: PCT/EP2005/050026
§ 371 (c)(1),
(2), (4) Date: May 1, 2009

(87) PCT Pub. No.: WO2005/069624
PCT Pub. Date: Jul. 28, 2005

(65) Prior Publication Data
US 2009/0222871 A1    Sep. 3, 2009

(30) Foreign Application Priority Data

Jan. 6, 2004  (FR) ..................... 04 00068

(51) Int. Cl.
*H04N 7/173* (2011.01)
*H04N 21/435* (2011.01)
(Continued)

(52) U.S. Cl.
CPC ............. *H04N 21/435* (2013.01); *H04H 60/73* (2013.01); *H04N 7/173* (2013.01); *H04N 21/235* (2013.01);
(Continued)

(58) Field of Classification Search
CPC .................................................. H04N 21/435
USPC ................................................ 725/112, 139
See application file for complete search history.

(56) References Cited

U.S. PATENT DOCUMENTS

| 5,872,784 | A | 2/1999 | Rostoker et al. |
| 7,013,322 | B2 * | 3/2006 | Lahr ............................. 709/201 |

(Continued)

FOREIGN PATENT DOCUMENTS

| EP | 1001631 | 5/2000 |
| JP | 11355766 | 12/1999 |

(Continued)

OTHER PUBLICATIONS

Zubarev, Yu B. "Digital Television Broadcasting", 2001, Basic Principles, Techniques Systems. Radio Research Institute p. 568.
(Continued)

*Primary Examiner* — Nasser Goodarzi
*Assistant Examiner* — Michael Hong
(74) *Attorney, Agent, or Firm* — Tutunjian & Bitetto, P.C.

(57) ABSTRACT

Within the context of the broadcasting of DVB services over an IP network, the trend is to separate the signalling information describing the network and the services offered from the services themselves. The signalling is made available to the terminals via XML files available on HTTP servers. In contrast to this approach, the invention consists of a method of recognition, by a receiver connected to a bidirectional network, of digital services on the bidirectional network, which comprises a step in which the receiver connects to a first stream, a step in which the receiver extracts from said stream information on the location on the network, on the one hand, of streams conveying the content of these services and, on the other hand, of separate streams conveying information describing these services, a step in which the receiver connects to at least some of the streams conveying service description information to obtain information on these services and a step in which the receiver uses this information to construct a list, possibly unitary, of the services available on the network.

10 Claims, 9 Drawing Sheets

(51) Int. Cl.
| | |
|---|---|
| H04N 21/235 | (2011.01) |
| H04N 21/2362 | (2011.01) |
| H04N 21/434 | (2011.01) |
| H04N 21/472 | (2011.01) |
| H04N 21/643 | (2011.01) |
| H04H 60/73 | (2008.01) |

(52) U.S. Cl.
CPC ......... *H04N 21/2362* (2013.01); *H04N 21/434* (2013.01); *H04N 21/4345* (2013.01); *H04N 21/472* (2013.01); *H04N 21/64322* (2013.01)

(56) References Cited

U.S. PATENT DOCUMENTS

| | | | |
|---|---|---|---|
| 7,150,029 B1* | 12/2006 | Ebling et al. | 725/39 |
| 7,386,879 B1* | 6/2008 | Van Willigen | 726/4 |
| 2001/0021996 A1* | 9/2001 | Crocitti et al. | 725/56 |
| 2003/0005451 A1* | 1/2003 | Connelly | 725/86 |
| 2003/0022643 A1* | 1/2003 | Djupsjobacka et al. | 455/158.1 |
| 2003/0106065 A1 | 6/2003 | Sakai et al. | |
| 2003/0133051 A1 | 7/2003 | Oishi et al. | |
| 2003/0233451 A1* | 12/2003 | Ludvig et al. | 709/225 |
| 2004/0187161 A1* | 9/2004 | Cao | 725/110 |
| 2005/0071889 A1* | 3/2005 | Liang | 725/139 |
| 2006/0277570 A1* | 12/2006 | Seo | 725/37 |
| 2007/0220574 A1* | 9/2007 | Schaefer et al. | 725/118 |
| 2008/0062998 A1 | 3/2008 | Kim et al. | |

FOREIGN PATENT DOCUMENTS

| | | |
|---|---|---|
| JP | 2001060926 | 3/2001 |
| JP | 2002262264 | 9/2002 |
| JP | 2003229903 | 8/2003 |
| WO | WO 01/05158 A1 | 1/2001 |
| WO | WO2005036851 | 4/2005 |

OTHER PUBLICATIONS

Translated Zubarev, Yu B. "Digital Televison Broadcasting". 2001. Basic Principles, Techniques Systems. Radio Research Institute, p. 568.

P. Stallard, T. Paila: "DVB thoughts on service discovery and selection", IETF Draft Mmusic Group, Feb. 10, 2003, pp. 1-11.

EBU-UER: "Digital Video Broadcasting (DVB); Specification for Service Information (EI) in DVB systems", Final Draft ETSI EN 300 468 V1.5.1. Jan. 2003. pp. 1-94.

EBU-UER: "Digital Video Broadcasting (DVB), Architectural framework for the delivery of DVB-services over IP-based networks" ETSI TR 102 033 V1.1.1, Feb. 2002, pp. 1-19.

ETSI: "Broadcast and On-line Services: Search, select, and rightful use of content on personal storage systems ("TV-Anytime Phase 1"); Part 6: Delivery of metadata over a bi-directional network; Sub-part 2: Service discovery" ETSI TS 102 822-6-2 V1.1.1, Oct. 2003, pp. 1-24.

Search Report Dated July 8, 2005.

Yamaguchi, Tetsuya et al., "Content Delivery Management System Using Metadata Technique", Proceedings 2 of IEICE 2003 Communication Society Conference, B-7-43, p. 224.

ETSI TS 102 822-6-2 V1.1.1, "Broadcast and on-line services: search, select, and rightful use of content on personal storage system (TV-Anytime Phase 1); Part 6, Delivery of metadata over a bi-directional network; sub-part 2: service discovery", Oct. 2003, pp. 1-26.

Stallard et al., "DVB thoughts on service discovery and selection", Internet Engineering Task Force draft MMUSIC group, Feb. 10, 2003, pp. 1-14.

Goto et al., "A scheme of digital broadcasting over IP network", Technical report of the institute of electronics, information and communication engineers, Oct. 31, 2002, vol. 102, No. 421, pp. 17-20. English Abstract.

Zubarev et al., "Digital TV broadcasting", Radio Research Institute, 2001, pp. 204-214 and pp. 314-328.

ETSI EN 300 468 V1.5.1 Standard, "Digital video broadcasting (DVB), specification for service information (SI) in DVB systems", Jan. 2003, pp. 1-94.

ISO IEC 13818-1 Standard, "Information Technology—Generic Coding of Moving Pictures and Associated Audio: Systems, Recommendation H.222.0", Nov. 13, 1994, pp. 1-161.

Anonymous, "Digital video broadcasting (DVB) IP phase 1 Handbook", Draft ETSI TS 1XX XXX V0.0.2, Dec. 5, 2003, pp. 1-61.

* cited by examiner

```
/* header */
for i=0 ; i < N ; i++ { /* first descriptor loop */
        descriptor();
}
for i=0 ; i < N ; i++ { /* loop on transport streams */
    transport_stream_identifier
    origin_network_identifier
    for (j=0 ; j<M ; j++) { /* second descriptor loop */
            descriptor();
        }
}
```

Fig. 6

METHOD OF TRANSMITTING DIGITAL SERVICES OVER A NETWORK AND DEVICE IMPLEMENTING THE METHOD

This application claims the benefit, under 35 U.S.C. §365 of International Application PCT/EP05/050026, filed Jan. 4, 2005, which was published in accordance with PCT Article 21(2) on Jul. 28, 2005 in English and which claims the benefit of French patent application No. 0400068, filed Jan. 6, 2004.

1. FIELD OF THE INVENTION

The present invention relates to the transmission of digital services and, more specifically, services compliant with the DVB (Digital Video Broadcasting) standard. DVB defines a service as "a sequence of programmes under the control of a broadcaster which can be broadcast as part of a schedule" on a network normally of the broadcast type (terrestrial, cable or satellite), but also more recently on an IP type network, in other words a network supporting the Internet protocol (IP). The specification of the IP can be found in the RFC (request for comments) documents maintained by the IETF (Internet Engineering Task Force), under number 791.

2. TECHNICAL BACKGROUND

The recognition of digital services offered by a network is standardized by DVB in the context of a satellite, cable or digital terrestrial transmission network. This standard is described in the document "Digital Video Broadcasting (DVB); Specification for Service Information (SI) in DVB Systems", published by the ETSI (European Telecommunication Standards Institute) under number ETSI EN 300 468. This document describes a set of tables containing information on the network, on the frequencies at which the data streams containing the services are transmitted, on the services offered, etc. The reader can also refer to the document "MPEG-2 system—ISO IEC 13818-1" for a definition of the transport stream format. A transport stream therefore contains audio data, video data, ancillary data such as subtitles, teletext or interactive applications in the form of elementary streams, and minimum mandatory signalling tables used to organize the content as a Network Information Table (NIT) enabling the other transport streams on the network to be found, the Program Association Table (PAT) and the Program Map Table (PMT) among others. These tables are multiplexed in the transport stream, the receiver being configured with the data needed to connect to a first stream enabling it to receive these tables and to construct, from their content, a database containing the list of services offered by the network and the connection data needed to receive them.

With the expansion of digital bidirectional data networks, in particular the Internet, and above all the roll-out of high speed services, the technical capability to transmit audiovisual digital services over this type of network is now available. Also, private, high bit rate IP networks are being developed, for both corporate and home use. Within this context, DVB is working to standardize the broadcasting of DVB services over the IP networks. A working group called DVB-IPI (Internet Protocol Infrastructure) is in the process of finalizing a specification concerning the transport of DVB digital services over an IP network and, more specifically, the recognition of these services. The proposal as currently envisaged is described in the document "DVB-IP Phase 1 Handbook" under reference IPI2003-227. The solution, as currently envisaged by the working group, is oriented towards a separation between the broadcasting of the services in the form of transport streams containing a single DVB service on the one hand and the information describing these services, available in the form of XML (eXtensible Markup Language) files accessible to the terminals on request, for example. The HTTP (Hyper Text Transport Protocol) can, for example, be used to retrieve these files. This solution seems natural because it exploits the bidirectional nature of the IP connection, as contrasted with satellite transmission, for example. In practice, standards such as DVB have been designed from the perspective of a unidirectional transmission network requiring all the information likely to be useful to a receiver to be transmitted permanently. The bidirectional nature of the networks considered means that a distinction can be drawn between the information useful for decoding the audiovisual service and the service description information. These two types of information that are conventionally included in a DVB stream are not used synchronously by the receiver. Their transmission over the network may therefore be separated, so providing a bandwidth saving by the fact that the signalling information is transmitted only on request and not permanently in the audio and video channel. Furthermore, the provision of information on an IP type network via HTTP servers in the form of XML data files is the predominant solution broadly adopted on this type of network.

However, this solution makes it necessary to develop a set of tools for generating and managing the servers offering this signalling information in XML format. In fact, at the present time, content broadcasters have a controlled infrastructure for transmitting MPEG-2 DVB services via satellite or cable. Since the adoption of this new signalling system means that new tools have to be developed in parallel with the existing system, operators have to make an investment and take a risk. Furthermore, terminals do not currently incorporate the tools needed to analyse this information, such as an XML analyser, for example. The incorporation of such tools in an inexpensive receiver may prove difficult and even impossible depending on the hardware resources available, such as processor power or memory.

3. SUMMARY OF THE INVENTION

The invention provides a method of transmitting digital services over a bidirectional data network and, more specifically, the recognition of the services offered on the network by a receiver. This method, used in the DVB context, enables most of the production chain currently deployed for DVB services for satellite or cable to be reused. This method should also enable the bandwidth used for broadcasting information for service recognition to be limited.

The invention relates to a method of recognition, by a receiver connected to a bidirectional network, of digital services on the bidirectional network which comprises a step in which the receiver connects to a first stream, a step in which the receiver extracts from said stream information on the location on the network, on the one hand, of streams conveying the content of these services and, on the other hand, of separate streams conveying information describing these services, a step in which the receiver connects to at least some of the streams conveying the service description information to obtain information on these services and a step in which the receiver uses this information to construct a list, possibly unitary, of services available on the network.

According to a particular embodiment of the invention, all the signalling tables relating to a service are contained in at least one stream other than the stream conveying the content of said service.

According to a particular embodiment of the invention, the method comprises a step for testing the mapping between an identifier and a filter contained in the descriptor of a stream used to determine whether a table having this identifier is available in said stream.

According to a particular embodiment of the invention, the first broadcast IP address and the first port number are entered by the user.

According to a particular embodiment of the invention, the first IP address and the first port number are obtained from the network by the receiver.

According to a particular embodiment of the invention, the streams contain only a single DVB service.

According to a particular embodiment of the invention, the list of services is included in the NIT contained in the stream available at the first broadcast IP address on the first port.

The invention also relates to a device having means of connecting to a broadcast IP address via means of connection to an IP network and means of decoding a DVB stream broadcast to this broadcast IP address, characterized in that the DVB stream decoding means have the capability of analysing an NIT, extracted from the stream, containing network descriptors suited to the IP network, and of connecting to each broadcast IP address described in said NIT to read in it a DVB stream and extract from it the information on the services offered on the network, preferably according to any one of the methods as defined above.

The invention also relates to a descriptor of a service for broadcasting a DVB stream for inclusion in an NIT, characterized in that it contains the broadcast IP address of a stream server and a port number to which said server broadcasts a DVB stream conveying the content of a service over an IP type network and at least one descriptor containing the broadcast IP address of a stream server and a port number to which said server broadcasts a DVB stream conveying signalling information relating to said service.

According to a particular embodiment of the invention, the one or more descriptors containing the broadcast IP address of a stream server and a port number to which said server broadcasts a DVB stream conveying signalling information relating to said service also contain the means of testing the mapping between an identifier and a filter.

4. LIST OF DRAWINGS

The invention will be better understood, and other features and advantages will become apparent on reading the description that follows, the description referring to the appended drawings, among which:

FIG. 6 represents the structure of an NIT (Network Information Table) according to the DVB standard;

Figure 1:
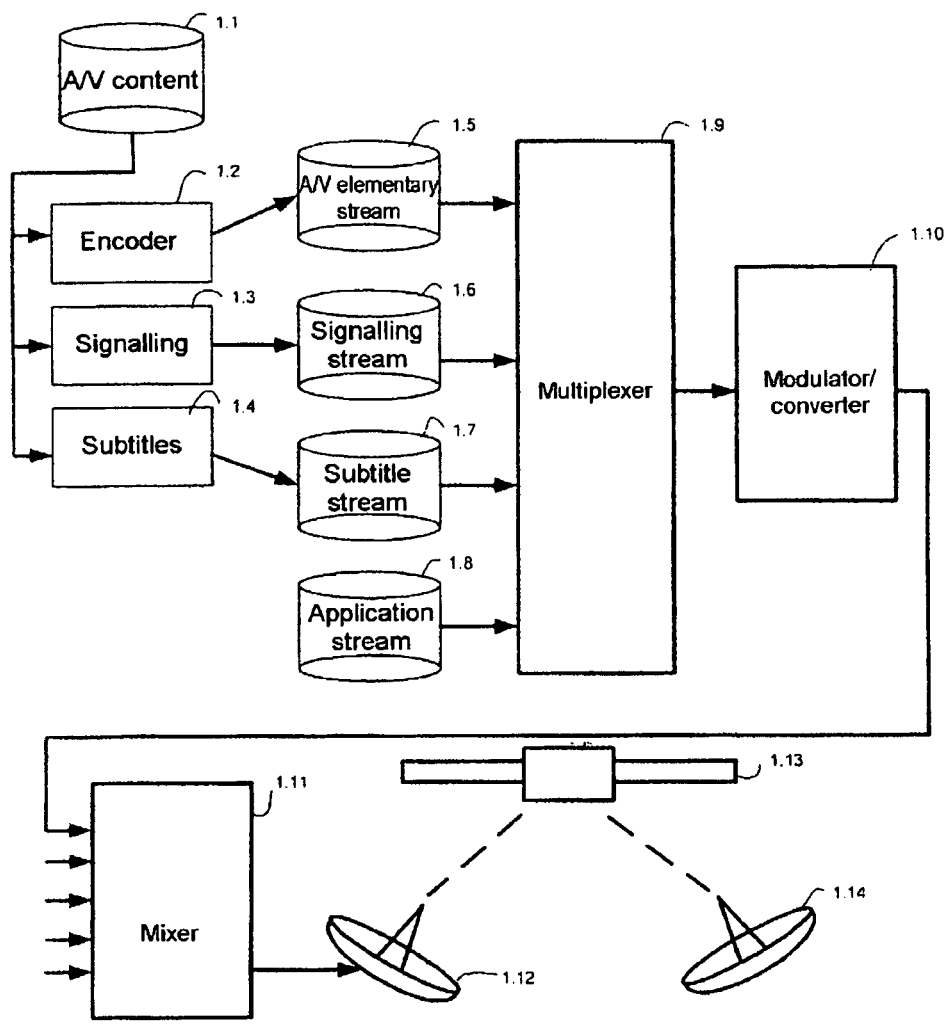
FIG. 1 represents a diagram of the DVB service production chain within the context of a conventional satellite broadcast.

The exemplary embodiment of the invention relates to the transmission of DVB services over an IP network, but can be applied to any other system of transmitting digital services over a bidirectional data network.

5. DETAILED DESCRIPTION OF THE INVENTION

The connection to a server on an IP type network can be achieved using an IP multicast protocol. One example of such a protocol is the IGMP (Internet Gateway Management Protocol) defined in RFC 2236. In that protocol, a multicast server has an associated multicast address. This address has the format of an IP address, in a domain reserved for this purpose, but does not correspond to the IP address of a machine that can be accessed on the network. A receiver wishing to connect to this server will send a request over the network containing this multicast IP address. This request will be relayed throughout the network until it reaches the server responsible for this broadcast, which will then register the receiver as a broadcast client. The routers on the path between the server and the receiver will then be able to relay the IP packets that make up the stream to the terminals subscribing to the broadcast. By knowing the IP address of the server machine in addition to the multicast IP address, an enhanced version of this protocol can optimize the route taken by the subscription request by routing it directly to the destination server instead of broadcasting it throughout the network. This enhanced version is known by the name SSM (Source Specific Multicast). It is therefore a system based on subscription to a digital data broadcast. A server broadcasts the digital data, in packet form, over the network. As long as no receiver subscribes to this broadcast, no packet is actually transmitted. When a receiver subscribes, the packets are transmitted to it by a routing through the network following a route between the server and the client. The protocol makes sure that the packets will use only the routes of the network that lead to receivers that are actually subscribing to the broadcast. When a receiver unsubscribes, the actual transmission of the packets to this receiver stops. The protocol also makes sure that the packets are not duplicated over a route portion of the network that leads to several receivers subscribing to the broadcast.

The transmission of the data that makes up the service can also be performed using an IP unicast protocol. One example of such a protocol is the real time streaming protocol (RTSP) defined in RFC 2326. Since this protocol is used to control the broadcasting of the stream over IP, it is designed to operate jointly with a broadcast protocol proper, such as RTP, the main difference from the multicast system being that for each client wishing to connect to the stream the server will initiate a point-to-point broadcast between itself and the client. Obviously this solution is more bandwidth-intensive than the multicast-based solution. In practice, in this solution, the data packets travelling over a route portion of the network that leads to a number of subscribing receivers am duplicated as many times as there are subscribing receivers. This solution can be considered in the context of a restricted network in which only a small number of terminals are likely to connect to a stream.

To limit the bandwidth used on broadcasting DVB services over an IP network while limiting the modifications to be made to the service production chain used by the broadcasters already offering services of this type on other transmission carriers such as satellite or cable, we will adopt an organization of the data forming the services as follows. On the one hand, a so-called installation stream will contain a table of information on the network closely derived from the DVB NIT and only this table, which we will call modified NIT in the sense that it uses the same syntax as the DVB NIT but contains specific descriptors, suited to the broadcasting of DVB services over IP. Moreover, the services will be separated into a content stream that will combine the elementary audio, video, subtitle and other service streams, as well as the minimum signalling used to organize these elementary streams such as the PAT and the PMT, and into a description stream containing only service description information. Only the content streams will retain the transport stream format as defined by MPEG-2. The installation and description streams are directly made up of tables such as the NIT for the installation stream and the SDTs or other tables for the description streams. These tables use the syntax of the MPEG-2 sections. In practice, access to the service description information is a one-off requirement not correlated to the need to decode the audio and video content. The current bandwidths on IP and the need to limit the bandwidth on the network make it probable that a stream will be created for each service, but the multiplexing of a number of services on a single stream is possible within the context of the invention.

To adapt the NIT to use on an IP network, descriptors suited to locating streams on an IP network must be defined. Such a descriptor suited to multicast use is given below:

| Syntax | No of identifier bits | |
|---|---|---|
| Ip_stream_descriptor ( ) { | | |
| Descriptor_tag | 8 | uimsbf |
| Descriptor_length | 8 | uimsbf |
| Content_multicast_address | 32 | bslbf |
| Content_multicast_port_number | 16 | bslbf |
| Content_multicast_protocol_mapping | 8 | bslbf |
| Content_source_address | 32 | bslbf |
| For (i=0; i < N; i++) { | | |
| Descriptor ( ) | | |
| } | | |
| } | | |

The "Descriptor_tag" field is an identifier corresponding to this new type of descriptor.

The "Descriptor_length" field gives the length of the descriptor.

The "Content_mulicast_address" field is the multicast IP address of the server on which the content stream is available.

The "Content_multicast_port_number" field is the port number on the server to which the receiver must connect to receive the content stream.

The "Content_multicast_protocol_mapping" field is a field identifying the encoding protocol of the or each service broadcast to this address. The protocol can be MPEG-2, MPEG-4, MHP or another. This optional field can be used to filter by content type to retain only those services that the receiver is able to decode.

The "Content_source_address" field is the real IP address of the server that provides for efficient routing of the connection request to a multicast server according to the SSM protocol.

The loop on the descriptors is used to manage the location descriptors of the or each description stream relating to the service, the content of which is broadcast to the previously defined address.

Below is a definition of another example of such a descriptor suited to unicast use:

| | | |
|---|---|---|
| Ip_stream_descriptor ( ) { | | |
| Descriptor_tag | 8 | uimsbf |
| Descriptor_length | 8 | uimsbf |
| Content_unicast_address | 32 | bslbf |
| Content_unicast_port_number | 16 | bslbf |
| Content_unicast_protocol_mapping | 8 | bslbf |
| For (i=0; i < N; i++) { | | |
| Descriptor ( ) | | |
| } | | |
| } | | |

The "descriptor_tag" field is an identifier corresponding to this new type of descriptor.

The "descriptor_length" field gives the length of the descriptor.

The "Content_unicast_address" field is the unicast IP address of the server on which the stream conveying the content is available.

The "Content_unicast_port_number" field is the port number on the server to which the receiver must connect to receive the stream conveying the content.

The "Content_unicast_protocol_mapping" field is a field identifying the encoding protocol of the or each service broadcast to this address. This protocol can be MPEG-2, MPEG-4, MHP or another. This optional field can be used to filter by content type to retain only those services that the receiver is able to decode.

The loop on the descriptors is used to manage the location descriptors of the or each description stream relating to the service, the content of which is broadcast to the previously defined address.

We will see in the structure of the DVB NIT, and therefore of the modified NIT, that there is a loop on the transport streams, which means that all the transport streams that make up the entire network of a broadcaster can be described in this loop. In this way, the receiver can construct a list with the multicast or unicast IP addresses of all the transport streams of a broadband TV broadcast over IP network. A list of service descriptors can optionally be included in the modified NIT to speed up the receiver installation phase.

Multicast and unicast stream servers present in the same network can also be envisaged.

In another, more sophisticated, implementation, the location descriptors of the information description streams relating to the transmitted service can, for example, take the following form:

| | | |
|---|---|---|
| Ip_stream_multicast_locator_descriptor ( ) { | | |
| Descriptor_tag | 8 | uimsbf |
| Descriptor_length | 8 | uimsbf |
| Filter_length | 8 | uimsbf |
| Filter_descriptor ( ) | | |
| multicast_address | 32 | bslbf |
| multicast_port_number | 16 | bslbf |
| multicast_protocol_mapping | 8 | bslbf |
| source_address | 32 | bslbf |
| } | | |

Here, we find the conventional fields of a descriptor for locating a stream broadcast over IP in multicast mode. Only the "Filter_length" and "Filter_descriptor" fields merit an explanation. In practice, within the context of the illustrative embodiment of the invention, the service description information is separated from the content information, and is conveyed in a single different stream. Yet, it is also possible to convey this signalling information, i.e. these tables, in a plurality of different streams. It is precisely to take this possibility into account that the "Ip_stream_descriptor" descriptor contains a loop. Yet, when this descriptor is scanned, it is not necessarily known which stream in the loop of descriptors will contain a given table that is being sought for the service affected by the descriptor. The act of introducing the "Filter_length" and "Filter_descriptor" fields in the descriptor makes it possible to implement a means of storing in the descriptor information for ascertaining which tables are contained in each stream of the loop. One way of encoding this information can, for example, be to place in this "Filter_descriptor" field the strings of bits used, for example, to program a demultiplexer to filter said tables. Since each table type has a given identifier, the filter can be programmed with the bit string representing the identifier of the table contained in the stream. In cases where it is desirable to be able to have a number of tables in the stream, the method used to program the filter of the demultiplexer can be adopted. A first bit string indicates an identifier that is to be filtered and a second string of the same length indicates for each bit of the first string whether that value is defined or not. A given identifier will therefore correspond to the filter if, for each bit of this identifier for which the corresponding bit of the second bit string is at one, the corresponding bit of the first string has the same value. For example, if strings on three bits are considered—a first bit string with a value of 0b101, a second string with a value of 0b110—the identifiers corresponding to this filter will have the values 0b101 and 0b100. This method can be used to define the tables contained in the stream in the same way as a demultiplexer would be programmed to retrieve them.

In another, simpler implementation, the location descriptors of the information description streams relating to the broadcast service can, for example, take the following form:

```
Ip_stream_multicast_locator_descriptor_table_ids ( ) {
    Descriptor_tag                      8    uimsbf
    Descriptor_length                   8    uimsbf
    NbOfTableIDs                        8    uimsbf
    TableIDList ( )
    multicast_address                   32   bslbf
    multicast_port_number               16   bslbf
    multicast_protocol_mapping          8    bslbf
    source_address                      32   bslbf
}
```

Here, we find the conventional fields of a descriptor used to locate a stream broadcast over IP in multicast mode. Only the "NbOfTableIDs" and "TableIDList" fields merit an explanation.

The "tableIDList" field corresponds to a list of table identifiers which are included in the corresponding stream, and the "NbOfTableIDs" field represents the number of table identifiers listed. Thus, a stream containing both information relating to the signalling information on the current and subsequent events of the current stream, for which the table identifier is 0x4E, and the signalling information on the current and subsequent events of the other streams, for which the table identifier is 0x4F, will have a descriptor with the value 2 for the "nbOfTableIds" and the values 0x4E and 0x4F in the "tableIDList" field.

Another possibility of implementing the broadcasting of the streams containing the signalling information may be to choose a simple file transfer protocol between the server and the receiver instead of the multicast protocol. Such a protocol can, for example, be the hypertext transfer protocol (HTTP). This protocol is simple to implement, especially if it is limited to implementing the capability to perform a "GET" to obtain a file from a server. This protocol is far simpler to manage than the XML file processing described in the introduction. In this case, it is important to have another descriptor such as the descriptor below, which is used to link, to a given identifier table, the URL (universal resource locator) of the file containing it:

```
Ip_stream_HTTP_locator_descriptor ( ) {
    Descriptor_tag                   8    uimsbf
    Descriptor_length                8    uimsbf
    Table_id                         8    bslbf
    For (i=0; i<N; i++) {
        Char                         8    bslbf
```

However, this method is not the preferred embodiment of the invention, because broadcasting by HTTP, just like in the unicast transmission of these signalling tables, involves a duplication of the data stream on the network for each receiver wanting to be installed. Yet, it is nevertheless an embodiment that can be considered on networks that do not contain many receivers, such as domestic networks.

FIG. 1 describes the general architecture of an MPEG-2 DVB service production chain within the context of a satellite broadcast. At the start of the chain, there is the audio and video content 1.1 that is to be broadcast. This content is encoded according to the MPEG-2 standard in an encoder 1.2 to generate an elementary audio/video stream 1.5. In parallel with the encoding of the audio and video content, the signalling information 1.3 is generated, which normally originates from a database containing the information describing the service that is to be broadcast. This information is generated in the form of a signalling stream 1.6. Another module 1.4 handles the generation of a subtitle stream 1.7. It is also possible to include an interactive application stream 1.8, the production chain of which is not detailed here. All these elementary streams, with other streams if necessary conveying other audio and video contents, the related or other signalling, are then multiplexed in a multiplexer 1.9 to generate the MPEG-2 transport stream that will then be modulated and converted to a frequency chosen by the modulator/converter 1.10. A set of streams of this type can be mixed by a mixer 1.11 for transmission to a satellite 1.13 via a transmission station 1.12. In this case, synchronization of the signalling information is necessary between the various streams to include information on the other streams in the tables describing each stream. These programmes can then be received in the home of the user via the latter's dish antenna 1.14, to be decoded by a set-top box and displayed on a television. This system is now well within the capabilities of broadcasters.

Figure 2:
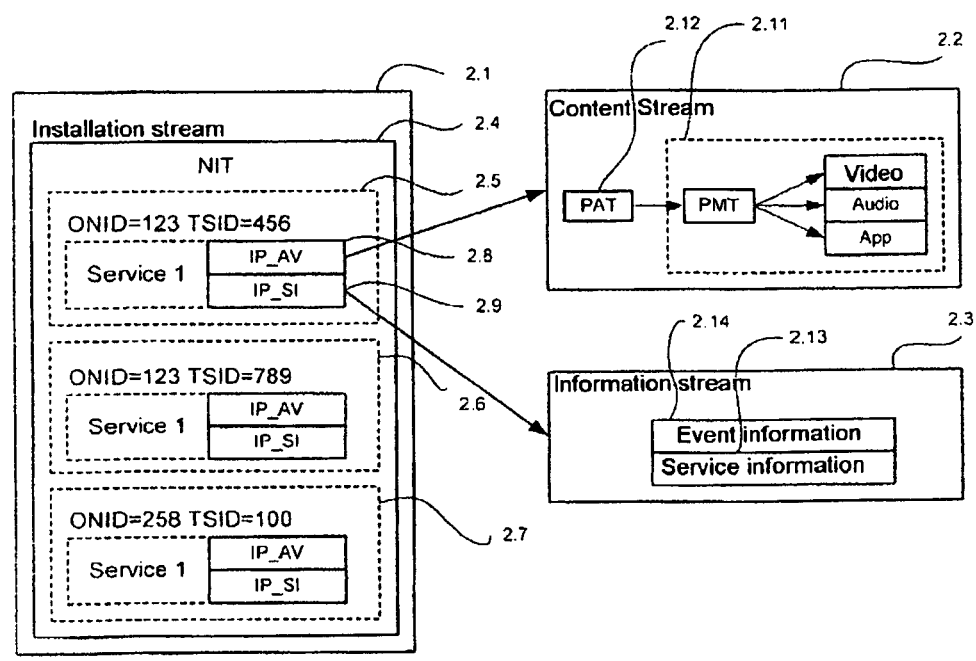
FIG. 2 represents an example of DVB data stream architecture within the context of one exemplary embodiment of the invention.

FIG. 2 represents an example of stream architecture according to an exemplary embodiment of the invention. In this example, a first stream 2.1, called an installation stream, is shown. This installation stream contains no audio or video content, but only the modified NIT 2.4 containing the network information. This installation stream can directly use the syntax of an MPEG-2 section and need not feature encapsulation in the form of a transport stream because of the fact that the data is directly transmitted over the IP network.

This modified NIT describes a number of streams containing services. The standard structure of an NIT as defined by DVB is given in FIG. 6. Although a stream, regardless of the transmission means, can contain a number of DVB services, it is probable that only the streams containing only one DVB service will be used initially in the context of broadcasting over IP, for reasons of bandwidth. The example described in FIG. 2 therefore reflects this case. However, it is obvious that the invention is not limited to the use of streams containing only one DVB service in the stream. We therefore have in the modified NIT 2.4 a description of three services 2.5, 2.6 and 2.7. The description of a service will contain the descriptors 2.8 and 2.9 for locating the content stream 2.2, as well as the stream containing the description relating to the service 2.3. The content stream 2.2 will contain a PAT (Program Association Table) pointing to the contents relating to a service 2.11 made up of a PMT (Program Map Table). The description stream 2.3 is therefore a separate stream from the preceding one. This stream does not have the format of the MPEG-2 transport streams but, directly, tables having the syntax of an MPEG-2 section. This separation enables a client to connect to this stream only when it needs to access the description information and therefore avoids using the bandwidth for permanent transmission of this information. Thus, the use of this bandwidth is improved. Remember that in broadcasting over IP, when a receiver unsubscribes from, a broadcast, the actual transmission of the packets over the network to that receiver stops. In the example, the description stream contains the information on the events 2.14, such as the information on the current event, the next event, and, where appropriate, the complete calendar of events so that an electronic program guide can be constructed. It also contains the information on the service 2.13, such as the SDT (Service Description Table).

Figure 3:
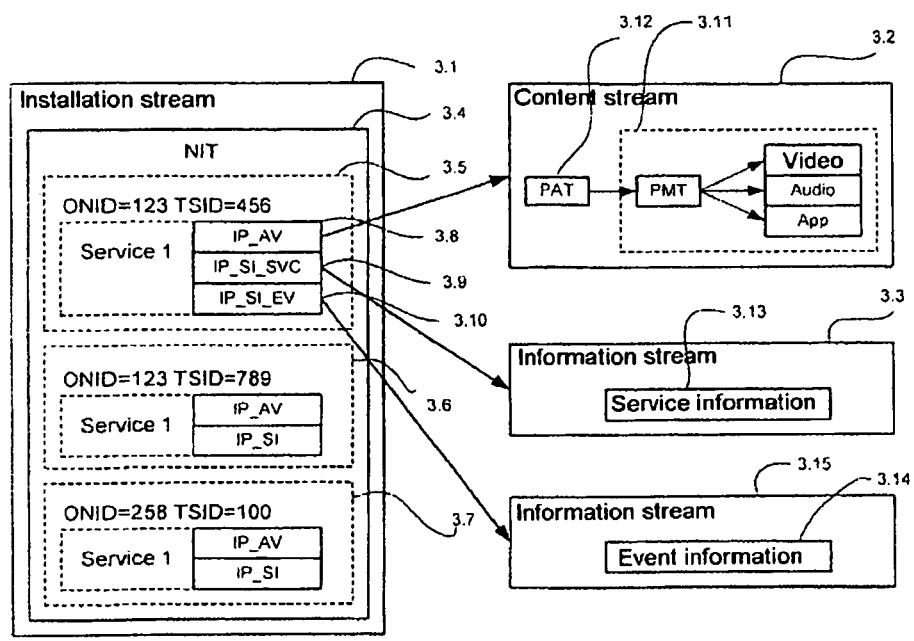
FIG. 3 represents an example of DVB data stream architecture within the context of one exemplary embodiment of the invention.

FIG. 3 is another example of stream architecture according to an exemplary embodiment of the invention. This example is very similar to the preceding one as represented in FIG. 2. The difference lies in the fact that, in this case, the description information relating to the events and the information relating to the service are conveyed by two different streams. We therefore in this case have, for the service 1 3.5, three screen descriptors 3.8, 3.9 and 3.10 instead of the two preceding ones pointing to the content stream 3.2, the service information stream 3.3 and the event information stream 3.15. It is therefore possible to divide up the different tables that make up the signalling information over different streams according to the available tables and the use that will be made of them to manage the network bandwidth. It is also possible to take the service management constraints into account by grouping together tables having the same update frequency.

Figure 4:
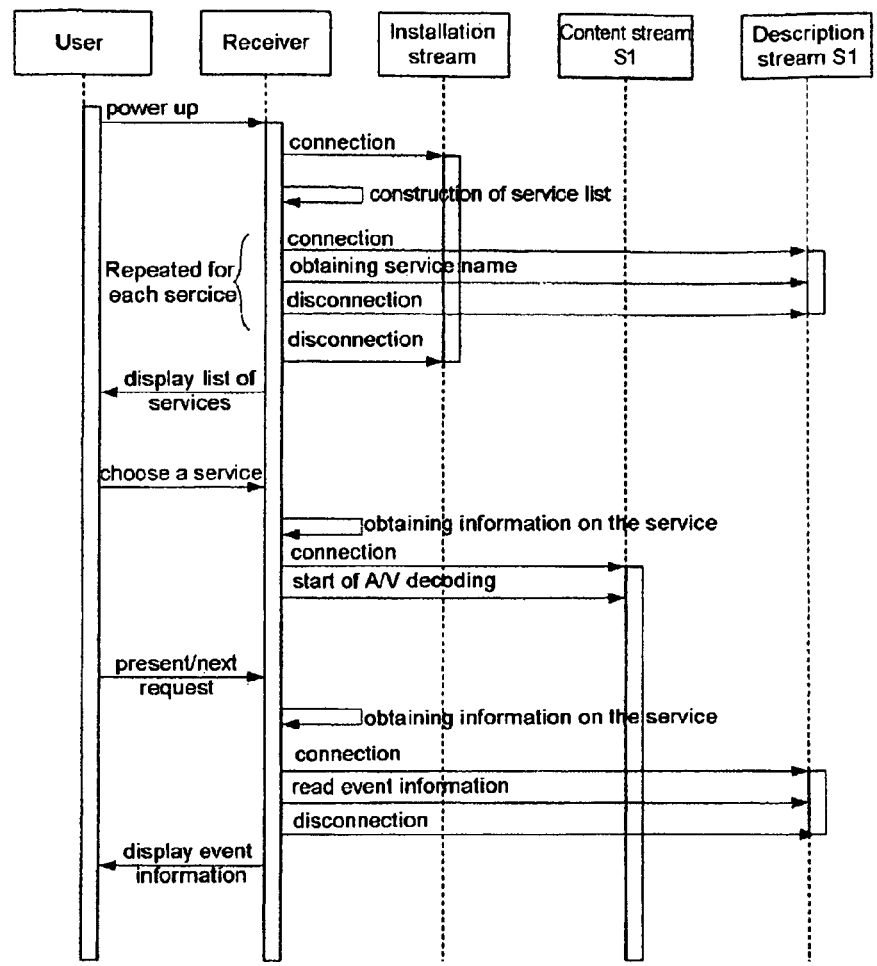
FIG. 4 represents the operation of a receiver within the context of one exemplary embodiment of the invention.

FIG. 4 represents a diagram showing players describing the phase of recognizing services present on the network. The entities represent on the one hand the user of the system who is watching his receiver, the receiver and the installation, service content and service description streams. Other streams relating to other services may be present in the network but are not shown in the figure. Initially, the user switches on his receiver. The receiver then connects to the installation stream. The receiver has parameters enabling it to connect initially to a multicast or unicast IP address. The simplest solution is to assume that this broadcast IP address is entered manually in a configuration menu. This broadcast IP address can also be assigned to the receiver in the connection phase via protocols such as DHCP (Dynamic Host Control Protocol) or PPP (Point to Point Protocol). However, any other method of determining this first IP address is possible. This address consists of a multicast or unicast IP address and a corresponding port number. The installation stream is broadcast to this address.

Once the receiver is connected to the installation stream, it can therefore decode the modified NIT and read the information contained in it. The receiver is therefore able to create a list of services available on the network. Scanning this list gives it access to the broadcast addresses of the content streams and the description streams broadcast over the network. This receiver can therefore connect in turn to these streams to collect the information on the services, including the name of each service. This means that it is then possible, for the receiver, to present a list of the services to the user. The user then chooses the service he wants to watch, and the receiver uses the descriptor of the content stream found in the modified NIT for the chosen service and connects to the content stream of the chosen service. The decoding and display of the chosen service can then begin. If the user then wishes to access the information on the current event or on the next event, he sends a request to that effect, and the receiver will once again use the descriptor contained in the modified NIT to find therein the location on the network of the description stream containing the information on the events. This information may be contained in the same stream as the service description information or in a separate stream as described in FIGS. 2 and 3. The receiver then connects to this stream and retrieves the information on the events so that it can display the information to the user.

The receiver can be connected to a stream, for example, via the IGMP. Normally, this transport stream is of the encapsulated MPEG-2 over IP type using the IP/UDP/RTP (User Datagram Protocol, Real Time Protocol) layers, but it can also be an MPEG-4, MHP or other type stream.

Figure 5:
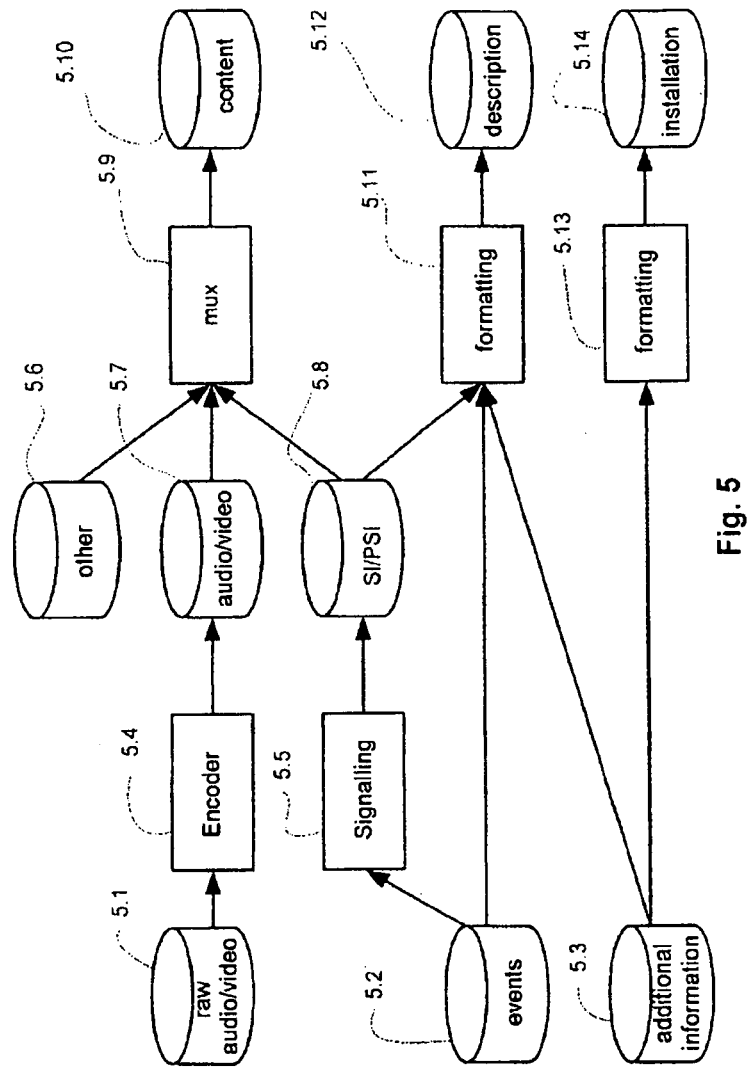
FIG. 5 represents a diagram of the DVB service production chain within the context of one exemplary embodiment of the invention.

FIG. 5 represents the stream production chain according to the invention. Firstly, the raw audio and video content 5.1 is encoded by the encoder 5.4 to give the elementary audio and video streams 5.7. A database 5.2 contains the entire description of the services and the information on the events. A module 5.5 is used to construct the signalling tables 5.8 with this information. The signalling information 5.8, the audio and video content streams 5.7, and other optional information such as interactive or other applications 5.6 are multiplexed 5.9 to construct a content stream 5.10. A first formatting module 5.11 uses the signalling tables 5.8 constructed, where appropriate, from information contained in the database 5.2 and additional information on other services 5.3 to construct the description stream 5.12. A second formatting module 5.13 uses the additional information on the network services 5.3 to construct the installation stream 5.14, which will contain the description of all the streams available on the network with the addresses providing access to them. The main modules that do not exist in the conventional DVB service production chain are these formatting modules 5.11 and 5.13. However, these modules are simple to construct because they merely construct streams containing signalling tables such as those that are already constructed by the signalling module 5.5, the novelty originating from the use of descriptors suited to locating a stream on an IP network, whether this stream is transmitted in multicast or unicast mode or even available via a file transfer protocol such as HTTP. These streams, 5.10, 5.12 and 5.14, once constructed, can then be transmitted to the servers of the IP network.

Figure 7:
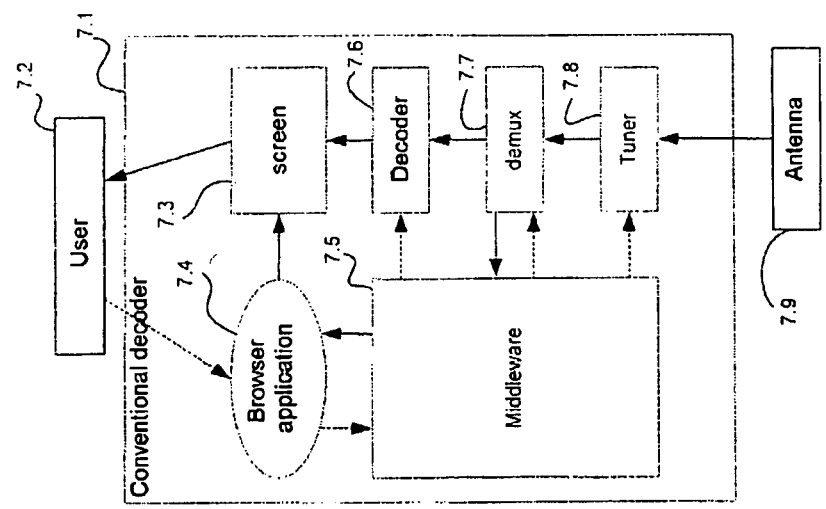
FIG. 7 represents the structure of a standard digital decoder, for example in the case of terrestrial reception.

FIG. 7 describes the architecture of a conventional decoder, such as a digital terrestrial decoder. The decoder 7.1 has a screen 7.3. The user 7.2 interacts through a browser application 7.4, which is displayed on the screen 7.3. All the decoder functions are driven by a management application conventionally referred to as middleware 7.5. This management application drives the hardware modules, namely the tuner 7.8, the demultiplexer 7.7 and the decoder 7.6. The tuner is responsible for recovering the DVB stream received by the antenna 7.9. This stream is demultiplexed by the demultiplexer, in other words the demultiplexer is able to reconstruct the different elementary streams that make up the DVB transport stream, such as audio, video and auxiliary data (such as subtitles, teletext or an interactive application) or a particular signalling table. In the DVB stream, each elementary stream is identified by an identifier and a demultiplexer can be programmed to filter the elementary streams that are of interest to us from the complete stream that is received. At least the audio and video streams are encoded to compress and/or encrypt the information that they contain, and the decoder is therefore there to decompress and/or decrypt these streams to restore the audio and video content to the user.

Figure 8:
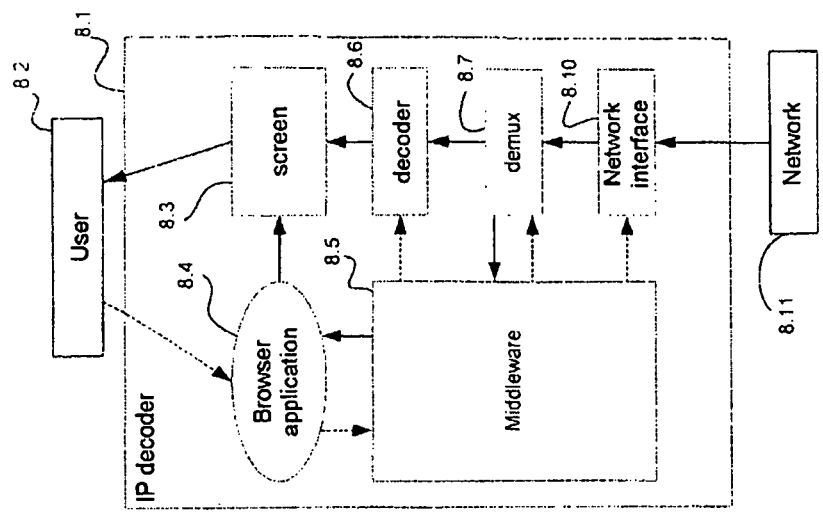
FIG. 8 represents the structure of a digital decoder suited to reception over IP.

FIG. 8 describes an IP decoder, designed to receive DVB streams over an IP network. The architecture is exactly the same as in the case of the conventional decoder, apart from the fact that the tuner is replaced by a network interface 8.10 connected to an IP network 8.11.

Figure 9:
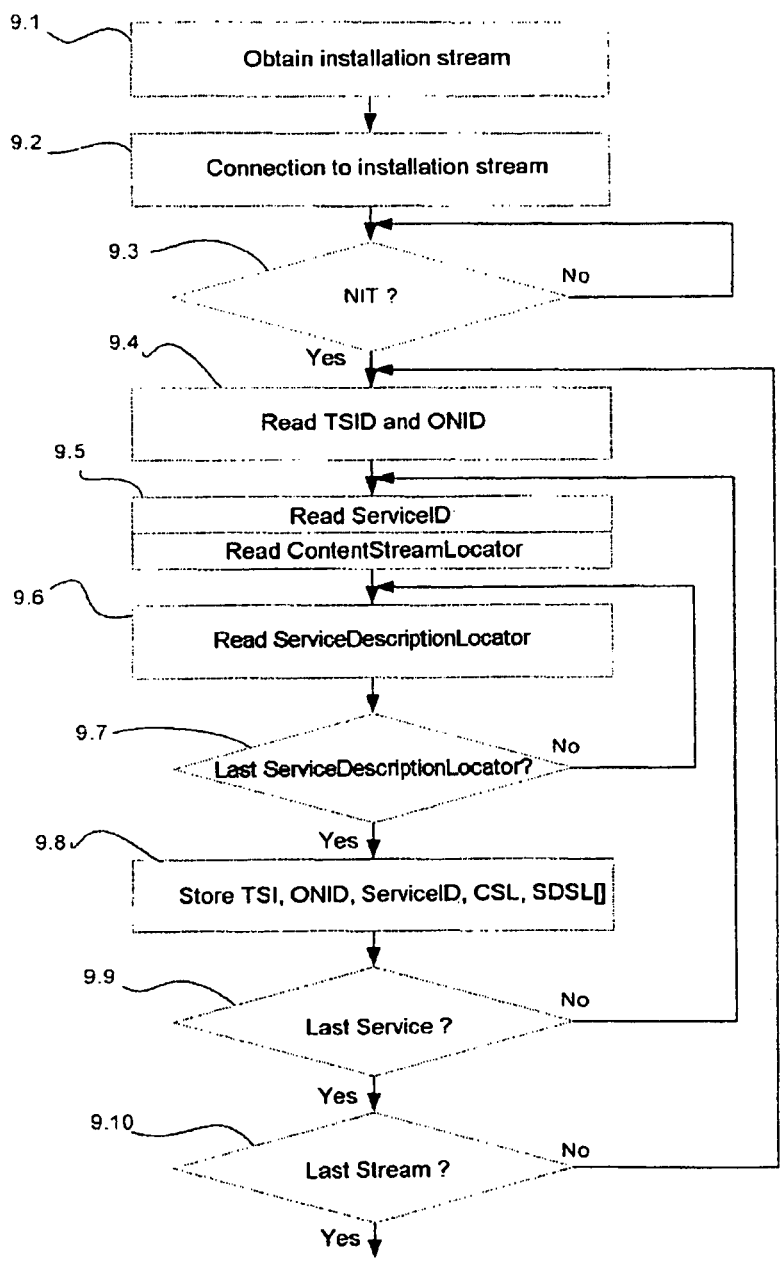
FIG. 9 represents a flow diagram of the service recognition phase.

FIG. 9 details the steps in recognizing services on the network. The first step consists in obtaining the installation stream 9.1. This stream is available on the network. There are many ways of making this stream available, of which at least three can be cited, and this stream can be transmitted in multicast mode, and can also be transmitted in unicast mode or be available via a file transfer protocol such as HTTP, for example. Regardless of how this installation stream is broadcast over the network, the decoder needs to be able to retrieve it, so it needs to know the address and the connection parameters for connecting to this stream. This first address can either be present in the read only memory of the device or be communicated to it by the user or even be communicated to the device by a server on connection to the network via a connection protocol enabling parameters to be acquired, such as DHCP (Dynamic Host Configuration Protocol) or PPP (Point to Point Protocol). The receiver is connected to the installation stream 9.2, and then searches it for a modified NIT 9.3. When this modified NIT is found, it reads in this modified NIT the description of a first transport stream characterized by its transport stream identifier (TSID) and its origin network identifier (ONID) 9.4. Then, since a transport stream can contain a number of services, the receiver starts reading the description of the services contained in the transport stream. For each service, the receiver begins by reading the service identifier and the data for locating the content stream 9.5. For each service, information on this service can be contained in a plurality of service description streams. The location of this plurality of description streams is specified in a series of descriptors that are now read 9.6 and 9.7. Then, for each service, the transport stream identifier, the origin network identifier, the service identifier, the location descriptor of the stream conveying the content of the service (CSL standing for "Content Stream Locator"), as well as the table of Service Description Stream Locators (SDSL) 9.8 are stored. These operations are repeated for each service contained in the transport stream as well as for each transport stream 9.9 and 9.10. In this way, a list of all the services available on the network is obtained, together with the descriptors of the streams broadcasting them both for the content and for the content description information.

Figure 10:
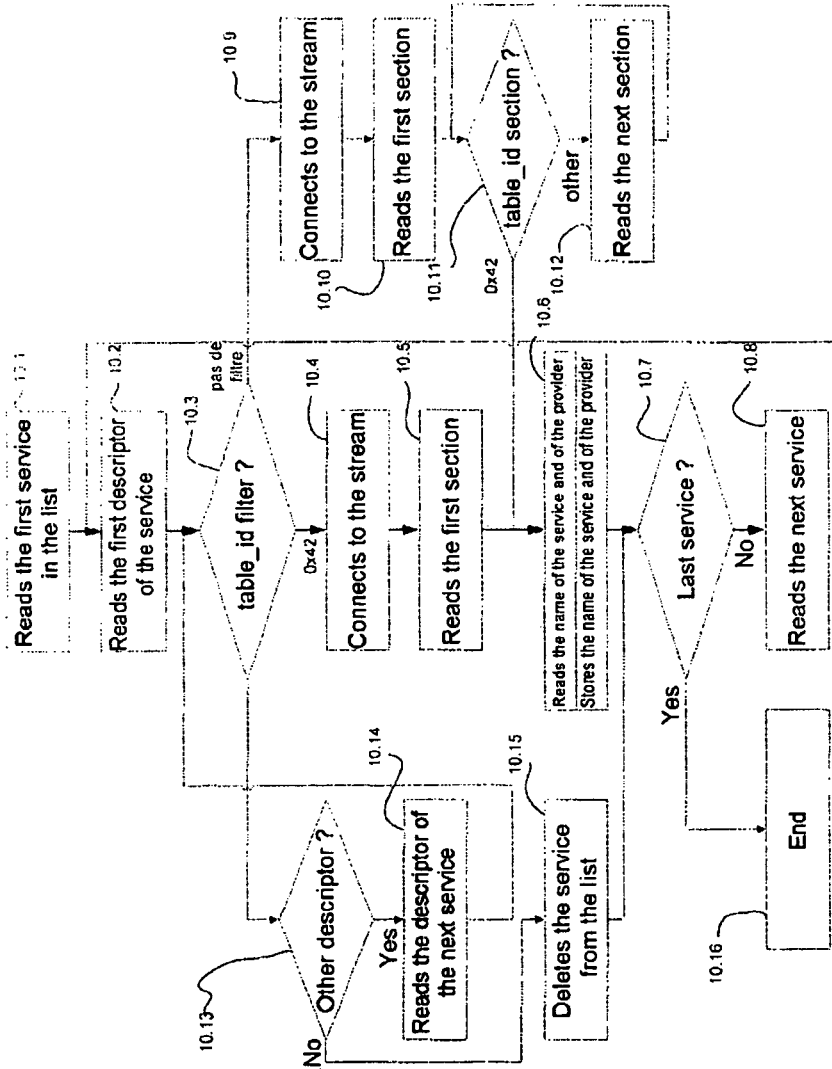
FIG. 10 represents a flow diagram of the service information reading phase.

FIG. 10 details an example of the way in which the information on the services can be recovered once the list of services has been constructed by scanning the modified NIT as explained in FIG. 9. To recover the information on the various services offered on the network, the receiver must find the Service Description Tables (SDT) for each service. To do this, it begins by reading the descriptor of the first service 10.1. It then reads the first Service Description Stream Locator (SDSL). Then, if this SDSL does not contain the "Filter_length" and "Filter_descriptor" fields providing information on whether the designated stream contains the SDT, it must connect to the stream 10.9, read from that stream the sections in search of an SDT for which the table identifier is 0x42, 10.10, 10.11 and 10.12. In the case where the "Filter_length" and "Filter_descriptor" fields exist, it will use these items of information to check for the presence of the SDT in the stream 10.3. If it is not present, it tests the next descriptor 10.13, 10.14 and finishes by deleting from the list a service for which it would not be able to find the SDT 10.15. When it has found the stream containing the SDT, it reads this table 10.5 and finds in it the name of the service and of the service provider, which it stores in memory 10.6. This operation is repeated for all the services 10.7, 10.8, up to the end of the list of services 10.16.

The invention enables broadcasters to re-use most of their existing production chain, in particular the multiplexers. The only development needed is that of formatting modules, for constructing streams containing only signalling tables, all or part thereof, and, where appropriate, not encapsulating them in a transport stream. This development is minimal. The invention also limits the modifications to be made to the software run on the decoders. In practice, mainly the part managing the IP interface, instead of the satellite or cable reception interface, has to be added, whereas the part of the application managing the installation has to be slightly modified. All the rest of the operation of the device is the same as for a standard decoder. Similarly, access control can be reused identically. The invention therefore makes it possible to adopt the broadcasting of DVB services over a broadband IP network while minimizing the investments and risks for broadcasters and the use of the available bandwidth on the network.

The invention claimed is:

1. A method of constructing a list of at least one digital service available on an Internet Protocol Type network, the method being implemented by a receiver connected to an Internet Protocol type network, the method comprising:
   connecting to a first Internet Protocol address and receiving an installation Internet Protocol stream;
   extracting from said installation Internet Protocol stream a second Internet Protocol address of at least one content Internet Protocol stream conveying content of said at least one digital service;
   extracting from said installation Internet Protocol stream a third Internet Protocol address of at least one second separate service description information Internet Protocol stream conveying service description information relating to said at least one digital service;
   connecting to said third Internet Protocol address and extracting from said at least one service description information Internet Protocol stream said service description information; and
   constructing, from said second Internet Protocol address extracted from said installation Internet Protocol stream and from said service description information extracted from said at least one service description information Internet Protocol stream, a list of at least one digital service available on the Internet Protocol type network.

2. The method according to claim 1, wherein the method further comprising retrieving the first Internet Protocol address from a configuration setting.

3. The method according to claim 1, further comprising retrieving, by the receiver, the first Internet Protocol address in a connection phase of the receiver to the Internet Protocol type network.

4. The method according to claim 1, wherein the at least one content Internet Protocol stream conveying the content of said at least one digital service contains only a single Digital Video Broadcasting service.

5. The method according to claim 1, wherein the installation Internet Protocol stream comprises a Network Information Table, and wherein said second Internet Protocol address and said third Internet Protocol address are comprised in said Network Information Table.

6. A receiver for receiving at least one digital service available on an Internet Protocol type Network, comprising:

a network interface for connecting to a first Internet Protocol address and for receiving an installation Internet Protocol stream; and a demultiplexer for extracting from said installation Internet Protocol stream, a second Internet Protocol address of at least one content Internet Protocol stream conveying content of said at least one digital service and for extracting from said installation Internet Protocol stream, a third Internet Protocol address of at least one service description information Internet Protocol stream conveying service description information relating to said at least one digital service;

said network interface being further configured to connect said third Internet Protocol address and extract said service description information from said at least one service description information Internet Protocol stream; and a processor configured to construct a list of at least one digital service available on the Internet Protocol type network from said second Internet Protocol address extracted from said installation Internet Protocol stream and from said service description information extracted from said at least one service description information Internet Protocol stream.

7. The receiver according to claim 6, wherein said processor is further configured to retrieve the first Internet Protocol address from a configuration setting.

8. The receiver according to claim 6, wherein the first Internet Protocol address is retrieved by the receiver in a connection phase of the receiver to the Internet Protocol type network.

9. The receiver according to claim 6, wherein the at least one content Internet Protocol stream conveying the content of said at least one digital service contains only a single Digital Video Broadcasting service.

10. The receiver according to claim 6, wherein the installation Internet Protocol stream comprises a Network Information Table, and wherein said second Internet Protocol address and said third Internet Protocol address are comprised in said Network Information Table.

* * * * *